United States Patent
Huang et al.

(10) Patent No.: US 11,802,058 B2
(45) Date of Patent: Oct. 31, 2023

(54) DISTRIBUTED ENERGY SOURCE SYSTEM UTILIZING WASTE HEAT DEEPLY

(71) Applicant: Dongguan University of Technology, Guangdong (CN)

(72) Inventors: Simin Huang, Guangdong (CN); Minlin Yang, Guangdong (CN); Kui He, Guangdong (CN); Wuzhi Yuan, Guangdong (CN)

(73) Assignee: Dongguan University of Technology, Guangdong (CN)

( * ) Notice: Subject to any disclaimer, the term of this patent is extended or adjusted under 35 U.S.C. 154(b) by 0 days.

(21) Appl. No.: 17/685,393

(22) Filed: Mar. 3, 2022

(65) Prior Publication Data

US 2023/0109836 A1    Apr. 13, 2023

(30) Foreign Application Priority Data

Oct. 12, 2021 (CN) .......................... 202111187796.2

(51) Int. Cl.
| | |
|---|---|
| *C02F 1/16* | (2023.01) |
| *F25B 15/06* | (2006.01) |
| *F25B 27/02* | (2006.01) |
| *F01D 15/10* | (2006.01) |
| *C02F 103/08* | (2006.01) |

(52) U.S. Cl.
CPC ................ *C02F 1/16* (2013.01); *F01D 15/10* (2013.01); *F25B 15/06* (2013.01); *F25B 27/02* (2013.01); *C02F 2103/08* (2013.01)

(58) Field of Classification Search
CPC ............. C02F 1/16; F25B 15/06; F25B 27/02
See application file for complete search history.

(56) References Cited

U.S. PATENT DOCUMENTS

| | | | | |
|---|---|---|---|---|
| 2011/0147195 A1* | 6/2011 | Shapiro | ..................... | C02F 1/16 203/10 |
| 2014/0319056 A1* | 10/2014 | Fuchigami | ............. | B01D 63/02 210/648 |

FOREIGN PATENT DOCUMENTS

| | | | | | |
|---|---|---|---|---|---|
| CN | 202849126 | * | 4/2013 | ................ | C02F 1/44 |
| CN | 105605647 | | 5/2016 | | |
| CN | 210176512 | * | 3/2020 | ................ | C02F 1/16 |

OTHER PUBLICATIONS

English machine translation of CN CN 210176512 (Year: 2020).*
English machine translation of CN 202849126 (Year: 2013).*

* cited by examiner

*Primary Examiner* — Renee Robinson
(74) *Attorney, Agent, or Firm* — JCIPRNET

(57) ABSTRACT

The present invention relates to a distributed energy source system utilizing waste heat deeply. The distributed energy source system utilizing waste heat deeply comprises a primary waste heat recycling module, a membrane distillation type seawater desalination module and a membrane type thermoosmosis power generation module. The distributed energy source system utilizing waste heat deeply provided by the present invention can recycle and deeply utilize waste heat and moisture in flue gas by means of the primary waste heat recycling module, the membrane distillation type seawater desalination module and the membrane type thermoosmosis power generation module to realize functions of seawater desalination and low-temperature power generation, has high energy utilization ratio and improves the waste heat utilization efficiency.

10 Claims, 1 Drawing Sheet

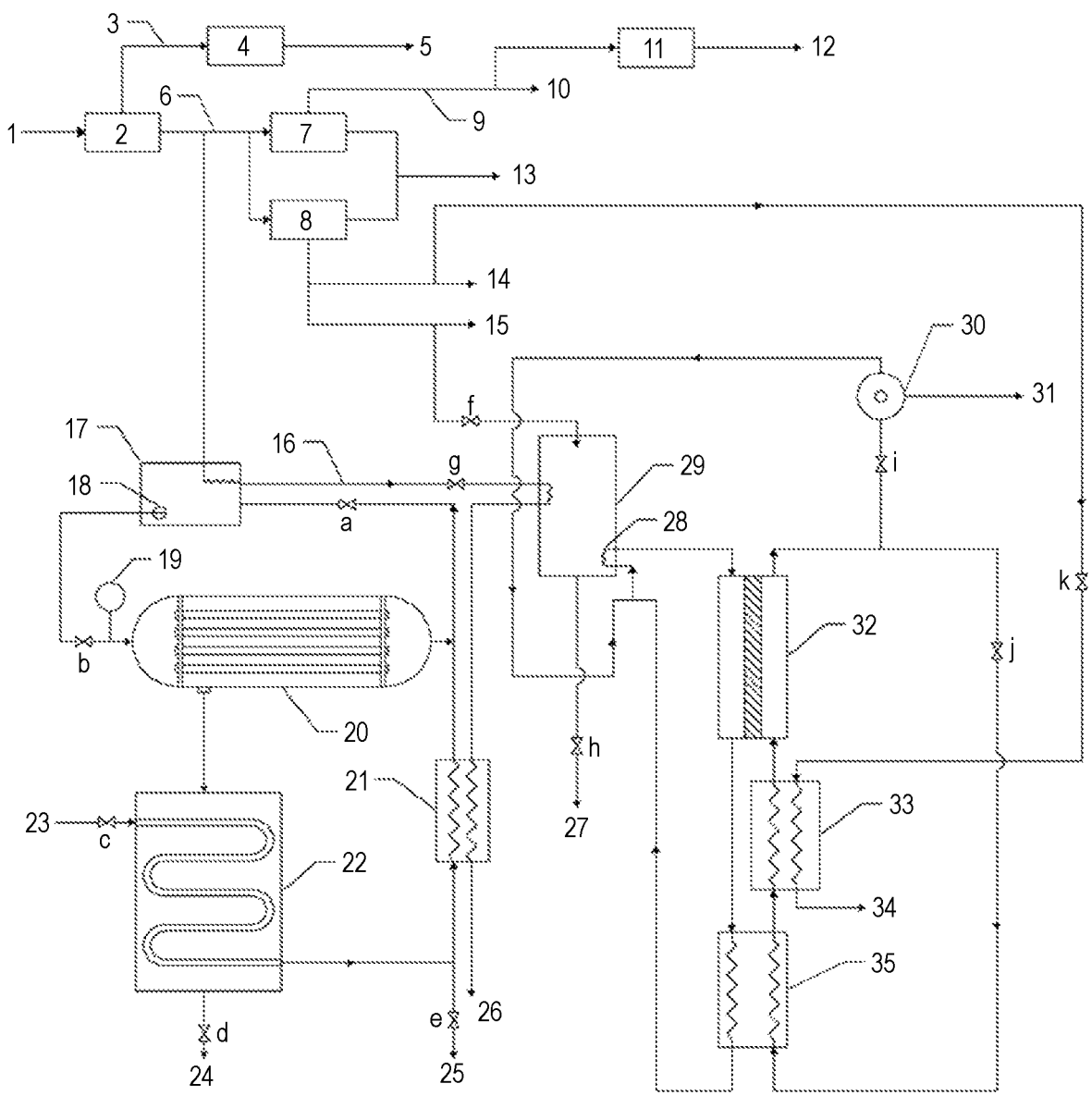

DISTRIBUTED ENERGY SOURCE SYSTEM UTILIZING WASTE HEAT DEEPLY

CROSS-REFERENCE TO RELATED APPLICATION

This application claims the priority benefit of China application serial no. 202111187796.2, filed on Oct. 12, 2021. The entirety of the above-mentioned patent application is hereby incorporated by reference herein and made a part of this specification.

TECHNICAL FIELD

The present invention belongs to the technical field of waste heat utilization, and in particular relates to a distributed energy source system utilizing waste heat deeply.

BACKGROUND

China, a country consuming massive energy sources, has wasted huge energy every year, and energy conservation and emission reduction is the researching hotspot all the time. In recent years, the speed of development of heavy metal industries such as steel and iron, chemical industry and thermal power generation industry in China is very high, and rapid development of high energy-consuming industries must bring great increase of energy consumption, which also aggravates the condition of energy waste. Measured by the Research Center of Building Energy-Saving affiliated to Tsinghua University, over 70% of electric power in China is from thermal power. A fossil energy converted into electric energy is then sent to a user terminal, and the energy conversion efficiency is actually ⅓. In other words, when the fossil energy is converted into electric energy, most energy cannot be converted, and this part of energy exists in form of heat mostly, and can be recycled theoretically. Direct emission of waste heat resource is a severe energy waste. Flue gas at higher temperatures is extremely prone to bringing damage to tail devices of a high energy consumption thermal power plant and damage to heating surfaces of related parts. Meanwhile, it causes certain influence to the ecological environment, so that global warming is aggravated. Therefore, recovery of heat and moisture in flue gas of high energy consumption devices (for example, a gas thermal power plant) is an important research content to realize deep energy conservation and emission reduction by the high energy consumption devices.

The gas thermal power plant has the capacity of enhancing the peak load regulation by a power grid flexibly and further can recover flue gas and steam exhaust waste heat thereof deeply, so that the energy utilization ratio is increased. It is shown by related data that by means of related matched technologies, under the condition of not increasing the consumption of natural gas and not decreasing the generating capacity, over 40% of heating supply capacity of the power plant can be increased. In addition, when a gas turbine works, it is needed to inhale a lot of fresh air and discharge a lot of exhaust gas as well, and the flue gas generated by burning a fuel is also of very high heat, so that the waste heat utilization prospect is wide.

The patent CN105605647A disclosed a synergistically purifying and full heat recovering type gas combined heat and power generation system. The system not only can recover water vapor and heat thereof in the flue gas deeply, but also can reduce the content of nitrogen oxide in the discharged flue gas. However, there are still few related researches.

It is undoubtedly that development of a novel system utilizing waste heat deeply has great economic significance and application value.

SUMMARY

Aiming at deficiencies or shortcoming in the prior art, the present invention provides a distributed energy source system utilizing waste heat deeply. The distributed energy source system utilizing waste heat deeply provided by the present invention can recycle and deeply utilize waste heat and moisture in flue gas by means of the primary waste heat recycling module, the membrane distillation type seawater desalination module and the membrane type thermoosmosis power generation module to realize functions of seawater desalination and low-temperature power generation, is high in energy utilization ratio and improves the waste heat utilization efficiency.

In order to achieve the objective of the present invention, the present invention adopts a technical scheme as follows:

the distributed energy source system utilizing waste heat deeply includes a primary waste heat recycling module, a membrane distillation type seawater desalination module and a membrane type thermoosmosis power generation module, wherein the primary waste heat recycling module includes an absorption type cold hot water unit for introducing a medium-high temperature flue gas;

the membrane distillation type seawater desalination module includes a hot seawater storage mechanism for introducing the medium-high temperature flue gas, a hydrophobic membrane distillation assembly, a condensation mechanism for introducing seawater as condensate water and a first dividing wall type heat exchanger; the hot seawater storage mechanism is internally provided with a liquid pump, the liquid pump is communicated with the hydrophobic membrane distillation assembly, and the hydrophobic membrane distillation assembly is communicated with the hot seawater storage mechanism; and the hydrophobic membrane distillation assembly, the condensation mechanism, the first dividing wall type heat exchanger and the hot seawater storage mechanism are communicated in sequence; and the membrane type thermoosmosis power generation module includes a heat storage mechanism connected with both a hot water output end of the absorption type cold hot water unit and a flue gas output end of the hot seawater storage mechanism, and a heating mechanism arranged in the heat storage mechanism for heating; and the heating mechanism is communicated with a membrane contactor; a third dividing wall type heat exchanger and the heating mechanism in sequence to realize circulation of a hot fluid, and the membrane contactor, the third dividing wall type heat exchanger, a second dividing wall type heat exchanger and the membrane contactor are communicated in sequence to realize circulation of a cold fluid, a cold water output end of the absorption type cold hot water unit is communicated with the second dividing wall type heat exchanger, and a cold water runner output end of the membrane contactor is communicated with a power generation mechanism and the heating mechanism in sequence to push the power generation mechanism to generate electricity.

The distributed energy source system utilizing waste heat deeply provided by the present invention can recycle and deeply utilize waste heat and moisture in flue gas to realize seawater desalination, is high in energy utilization ratio and improves the waste heat utilization efficiency.

Specifically, in the primary waste heat recycling module, the absorption type cold hot water unit absorbs heat in the medium-high temperature flue gas and outputs hot water (a thermal charge) and cold water (a cold charge) simultaneously, and meanwhile, the medium-high temperature flue gas is decreased to room temperature to be discharged.

In the membrane distillation type seawater desalination module, seawater is introduced into the condensation mechanism as condensate water, flows into a cold fluid runner of the first dividing wall type heat exchanger after condensing heat absorption, and flows back to the hot seawater storage mechanism after heat exchange treatment. Meanwhile, the medium-high temperature flue gas is introduced into the hot seawater storage mechanism as a heat source. Heat in the high temperature flue gas is absorbed by seawater in the hot seawater storage mechanism and the seawater is turned into hot seawater, and the hot seawater (for example, hot seawater at 65° C.) is introduced into the hydrophobic membrane distillation assembly through the liquid pump. As a membrane material in the hydrophobic membrane distillation assembly is hydrophobic, aqueous solutions on two sides of a membrane cannot interpenetrate to the other side but the seawater on one side of the hot fluid is evaporated to become water vapor. Driven by a pressure difference between water vapor on two sides of the membrane, the aqueous solution enters the other side of the membrane material and is condensed into liquid fresh water in the condensation mechanism. The liquid fresh water can be discharged and the pressure difference between water vapor of the hydrophobic membrane distillation assembly can be maintained.

Through the membrane distillation type seawater desalination module, recovery of waste heat in the flue gas is realized, and meanwhile, desalinating treatment of the seawater is realized.

In the membrane type thermoosmosis power generation module, the medium-high temperature flue gas (higher than 120° C.) is introduced into the hot seawater storage mechanism and is turned into medium-low temperature flue gas (50-120° C.) after heat exchange with the seawater, the medium-low temperature flue gas is introduced into the heat storage mechanism, the hot water output end of the absorption type cold hot water unit outputs hot water (at a higher temperature) into the heat storage mechanism, and the hot water (at a higher temperature) can be discharged as domestic hot water after heat release; and the flue gas flows into the first dividing wall type heat exchanger and is discharged after heat exchange treatment.

The hot fluid which absorbed heat in the heating mechanism flows through the membrane contactor and the second dividing wall type heat exchanger in sequence and then flows back to the heating mechanism, thereby realizing circulation of the hot fluid. The cold fluid in the membrane contactor flows through the third dividing wall type heat exchanger and the second dividing wall type heat exchanger in sequence and then flows back to the membrane contact, thereby realizing circulation of the cold fluid. Meanwhile, a semipermeable membrane in the membrane contactor has high hydrophobicity and high moisture-penetrability. As the pressure of the hot fluid runner in the membrane contactor is larger than that of the cold fluid runner, a pressure difference is generated between the cold fluid runner and the hot fluid runner. Hot steam in the hot fluid runner penetrates through the semipermeable membrane and enters the cold fluid runner due to the pressure difference to achieve a heat mass exchange purpose, thereby, increased mass in the cold fluid runner of the membrane contactor causes that the fluid flowing out from the cold fluid runner output end is increased and that a pressure thereof is increased, and the increased fluid and pressure are used for pushing the power generation mechanism to generate electricity and output an electric load. Water after power generation flows back to the heating mechanism to absorb heat continuously so as to provide continuous heat energy cyclically.

Through the membrane type thermoosmosis power generation module, utilization of low-temperature waste heat in the flue gas is realized, and meanwhile, the thermal load (hot water) output by the absorption type cold hot unit is converted into electric energy, so that the recovery of waste heat is realized.

Preferably, the primary waste heat recycling module further includes a waste heat steam boiler for introducing the medium-high temperature flue gas, and the waste heat steam boiler is communicated with a rotary dehumidifying device.

A waste heat steam boiler can absorb heat in the high-temperature flue gas and converts the heat into steam. A part of steam can be directly conveyed to a user while the other part of steam is introduced into the rotary dehumidifying device, and dried air is obtained after dehumidifying treatment.

Preferably, the absorption type cold hot water unit is a lithium bromide cold hot water unit.

Preferably, the hot seawater storage mechanism is a hot seawater storage box.

Preferably, the condensation mechanism is a condenser.

Preferably, a seawater runner in a shell pass of the condensation mechanism and a water vapor runner in a tube pass of the condensation mechanism are same in flow direction. That is, the tube pass input end and the shell pass input end are located on a same side of the condensation mechanism and the tube pass output end and the shell pass output end are located on the other side of the condensation mechanism.

Preferably, a cold fluid runner and a hot fluid runner of the first dividing wall type heat exchanger are opposite in flow direction. The input end of the cold fluid runner and the output end of the hot fluid runner are located on a same side of the second dividing wall type heat exchanger, and the output end of the cold fluid runner and the input end of the hot fluid runner are located on the other side of the second dividing wall type heat exchanger.

Preferably, a tube pass output end of the hydrophobic membrane distillation assembly is communicated with the hot seawater storage mechanism, a steam output end of the hydrophobic membrane distillation assembly is communicated with the tube pass input end of the condensation mechanism, a shell pass output end of the condensation mechanism is communicated with the first dividing wall type heat exchanger, and a cold fluid output end of the first dividing wall type heat exchanger is communicated with the hot seawater storage mechanism.

Preferably, a first valve is arranged between the first dividing wall type heat exchanger and the hot seawater storage mechanism, the first valve is used for controlling the cold fluid of the first dividing wall type heat exchanger flows into the hot seawater storage mechanism.

Preferably, a second valve is arranged between the liquid pump and the hydrophobic membrane distillation assembly.

Preferably, the condensation mechanism is provided with a third valve which controls introduction of the seawater.

Preferably, the tube pass output end of the condensation mechanism is provided with a fourth valve for regulating outflow of the fresh water.

Preferably, the shell pass output end of the condensation mechanism is provided with a fifth valve, and the seawater flows into the first dividing wall type heat exchanger via the shell pass output end. In addition, the seawater can further be discharged via the fifth valve to regulate the water level in the hot seawater storage mechanism.

Preferably, a sixth valve is arranged between the hot water output end of the absorption type cold hot water unit and the heat storage mechanism.

Preferably, a seventh valve is arranged between the flue gas output end of the hot seawater storage mechanism and the heat storage mechanism.

Preferably, the flue gas output end of the heat storage mechanism is provided with an eighth valve.

Preferably, a ninth valve is arranged between the membrane contactor and the power generation mechanism.

Preferably, a tenth valve is arranged between the membrane contactor and the third dividing wall type heat exchanger.

Preferably, an eleventh valve is arranged between the cold water output end of the cold hot water unit and the second dividing wall type heat exchanger.

Preferably, the liquid pump is communicated with the hydrophobic membrane distillation assembly via a pipeline, and the pipeline is provided with a temperature detection mechanism for detecting a temperature of a liquid in the pipeline.

More preferably, the temperature detection mechanism is a thermometer.

Preferably, the heat storage mechanism is a hot water tank.

Preferably, the heating mechanism is a heating coil.

Preferably, the power generation mechanism is a turbine.

A flue gas output end of the heat storage mechanism is communicated with the first dividing wall type heat exchanger and an atmosphere in sequence for discharging flue gas.

Preferably, the distributed energy source system utilizing waste heat deeply further includes a gas turbine power generator set, a flue gas generated by the gas turbine power generator set serving as the medium-high temperature flue gas.

Preferably, the type of the first dividing wall type heat exchanger is a tube shell type heat exchanger. The first dividing wall type heat exchanger is provided with the cold fluid runner and the hot fluid runner. The cold fluid flows through the tube pass and the hot fluid flows through the shell pass. A sensible heat exchanger is arranged between the cold fluid runner and the hot fluid runner of the first dividing wall type heat exchanger, and the fluids in the cold fluid runner and the hot fluid runner of the first dividing wall type heat exchanger are opposite in flow direction.

Preferably, the type of the second dividing wall type heat exchanger is a tube shell type heat exchanger. The second dividing wall type heat exchanger is provided with the cold fluid runner and the hot fluid runner. The cold fluid flows through the tube pass and the hot fluid flows through the shell pass. A sensible heat exchanger is arranged between the cold fluid runner and the hot fluid runner of the second dividing wall type heat exchanger, and the fluids in the cold fluid runner and the hot fluid runner of the second dividing wall type heat exchanger are opposite in flow direction.

Preferably, the type of the third dividing wall type heat exchanger is a tube shell type heat exchanger. The third dividing wall type heat exchanger is provided with the cold fluid runner and the hot fluid runner. The cold fluid flows through the tube pass and the hot fluid flows through the shell pass. A sensible heat exchanger is arranged between the cold fluid runner and the hot fluid runner of the third dividing wall type heat exchanger, and the fluids in the cold fluid runner and the hot fluid runner of the third dividing wall type heat exchanger are opposite in flow direction.

Preferably, the second dividing wall type heat exchanger and the third dividing wall type heat exchanger exchange heat by using the sensible heat exchanger, and do not have a mass transfer characteristic but only can exchange sensible heat, so that it can be ensured that the fluids flowing out from the output end of the cold fluid runner and the output end of the hot fluid runner in the membrane contactor merely exchange heat rather than generating mass transfer.

Compared with the prior art, the present invention has the following beneficial effects:

the distributed energy source system utilizing waste heat deeply provided by the present invention can recycle and deeply utilize waste heat and moisture in flue gas by means of the primary waste heat recycling module, the membrane distillation type seawater desalination module and the membrane type thermoosmosis power generation module to realize functions of seawater desalination and low-temperature power generation, is high in energy utilization ratio and improves the waste heat utilization efficiency.

BRIEF DESCRIPTION OF THE DRAWINGS

FIGURE is a structural schematic diagram of a distributed energy source system utilizing waste heat deeply provided by an embodiment 1.

In the drawing, 1—fuel (natural gas or gasoline); 2—gas turbine power generator set; 3—electric power; 4—parallel cabinet; 5—first electric load; 6—medium-high temperature flue gas (higher than 120° C.); 7—waste heat steam boiler; 8—absorption type cold hot water unit; 9—high quality steam; 10—output steam; 11—rotary dehumidifying device; 12—dried air; 13—flue gas (≈25° C.); 14—cold water; 15—hot water; 16—medium-low temperature flue gas (50—120° C.); 17—hot seawater storage mechanism; 18—liquid pump; 19—temperature detection mechanism; 20—hydrophobic membrane distillation assembly; 21—first dividing wall type heat exchanger; 22—condensation mechanism; 23—seawater serving as condensate water; 24—fresh water; 25—seawater; 26—exhausted flue gas (≈25° C.); 27—domestic hot water; 28—heating mechanism; 29—heat storage mechanism; 30—power generation mechanism; 31—second electric load; 32—membrane contactor; 33—second dividing wall type heat exchanger; 34—drained water; 35—third dividing wall type heat exchanger; a—first valve; b—second valve; c—third valve; d—fourth valve; e—fifth valve; f—sixth valve; g—seventh valve; h—eighth valve; i—ninth valve; j—tenth valve; k—eleventh valve.

DESCRIPTION OF THE EMBODIMENTS

In order to make purposes, technical schemes and advantages of the prevent invention clearer, the prevent invention is further described in detail below in combination with drawings and embodiment of the description. It should be understood that the specific embodiments described herein are merely used for explaining the prevent invention, instead of limiting the prevent invention. In addition, technical features involved in the described embodiments of the present invention can be combined with one another as long as they do not conflict with each other.

It is to be noted that when a component is regarded as being "arranged" and "disposed" on another component, the component can be directly on another component or a component arranged in the center may exist as well. It is to be noted that when one component is regarded as being "connected with" another component, the component can be directly connected to another component or a component arranged in the center may exist as well. The terms "upper", "lower", "left", "right" and similar expressions used herein are merely for an explanatory purpose rather than a unique implementation mode.

Embodiment 1

The embodiment provides a distributed energy source system utilizing waste heat deeply, including a primary waste heat recycling module, a membrane distillation type seawater desalination module and a membrane type thermoosmosis power generation module. The distributed energy source system utilizing waste heat deeply take the high-temperature flue gas generated by the power supply system as an object of waste heat recovery.

Specifically, the power supply system includes a gas turbine power generator set 2 and a parallel cabinet 4. The gas turbine power generator set 2 generates electricity by taking natural gas (or gasoline) as a fuel 1 to generate electric power 3. The electric power 3 is conveyed to the parallel cabinet 4 and an electric user to realize the output and utilization of the first electric load 5, and meanwhile, waste heat in the medium-high temperature flue gas 6 generated by the gas turbine power generator set 2 is recovered.

The primary waste heat recycling module includes the waste heat steam boiler 7 which produces steam, the absorption type cold hot water unit 8 (specifically the lithium bromide absorption type cold hot water unit) and the rotary dehumidifying device 11. The waste heat steam boiler 7 is communicated with the rotary dehumidifying device 11. The waste heat steam boiler 7 produces the high quality steam 9 by using the medium-high temperature flue gas 6 generated by the gas turbine power generator set 2, wherein a part of steam is directly output to the user to form output steam 10 while the other part of steam enters the rotary dehumidifying device 11 and is dehumidified by the rotary dehumidifying device 11 to produce dried air 12.

The lithium bromide absorption type cold hot water unit produces and outputs cold water 14 (cold load) and hot water 15 (thermal load) by using the medium-high temperature flue gas 6 of the gas turbine power generator set 2. The temperature of the flue gas 13 discharged from the waste heat steam boiler 7 and the lithium bromide absorption type cold hot water unit 8 is decreased to about an environment temperature ($\approx 25°$ C.), and the flue gas is discharged.

The membrane distillation type seawater desalination module includes the hot seawater storage mechanism 17 (specifically the hot seawater storage tank), the liquid pump 18, the thermometer 19, the hydrophobic membrane distillation assembly 20, the first dividing wall type heat exchanger 21 (specifically the tube shell type heat exchanger), the condensation mechanism 22 (specifically the condenser) taking the seawater 23 as the condensate water, the first valve a, the second valve b, the third valve c, the fourth valve d and the fifth valve e.

The membrane type thermoosmosis power generation module includes domestic hot water 27, the heating mechanism 28 (specifically the heating coil), the heat storage mechanism 29 (specifically a heat box), the power generation mechanism 30 (specifically the turbine), the membrane contactor 32, the second dividing wall type heat exchanger 33 (specifically the tube shell type heat exchanger), the third dividing wall type heat exchanger 35 (specifically the tube shell type heat exchanger), the sixth valve f, the seventh valve g, the eighth valve h, the ninth valve I, the tenth valve j and the eleventh valve k.

The medium-high temperature flue gas 6 generated by the gas turbine power generator set 2 is connected to the hot seawater storage box. The seawater 23 enters a shell pass of the condenser via the third valve c. The seawater runner in the shell pass of the condenser and the water vapor runner in the tube pass are same in flow direction. The tube pass outlet of the condenser is provided with the fourth valve d. A discharged seawater end of the outlet of the shell pass outlet of the condenser is provided with the fifth valve e. The first dividing wall type heat exchanger 21 is provided with the cold fluid runner and the hot fluid runner. The cold fluid flows through the tube pass and the hot runner flows through the shell pass. The cold fluid runner and the hot fluid runner are opposite in flow direction, and the shell pass output end of the condenser is connected with the cold fluid runner of the first dividing wall type heat exchanger 21. The tube pass input end of the hydrophobic membrane distillation assembly 20 is communicated with the liquid pump 18 in the hot seawater storage box. The second valve b is arranged between the liquid pump 18 and the hydrophobic membrane distillation assembly 20. The shell pass output end of the hydrophobic membrane distillation assembly 20 is connected with the tube pass input end of the condenser. The tube pass output end of the hydrophobic membrane distillation assembly 20 is combined with the cold fluid runner of the first dividing wall type heat exchanger 21 and enters into the hot seawater storage box, and the first valve a is arranged between the first dividing wall type heat exchanger 21 and the hot seawater storage box.

When the membrane distillation type seawater desalination module works, the medium-high temperature flue gas 6 is introduced into the hot seawater storage box to heat the seawater in the hot seawater storage box (for example, heat the seawater to 65° C.). The seawater 23 enters the condenser via the third valve c, which plays a role in condensing fresh water steam with relatively high temperature by the seawater 23 with relatively low temperature, so that the seawater becomes the liquid fresh water 24 which is discharged via the fourth valve d.

The medium-high temperature flue gas 6 enters the hot seawater storage box and is introduced into the hot box to form the medium-low temperature flue gas 16 after heat exchange treatment. A part of seawater flowing out from the shell pass output end of the condenser enters the first dividing wall type heat exchanger 21 to exchange heat with the medium-low temperature flue gas 16 output from the hot box, thereby improving the waste heat utilization efficiency and the seawater desalination efficiency as the flue gas is preheated by the seawater. The other part of the seawater is discharged via the fifth valve e, so that the water level in the hot seawater storage box is controlled. The output end of the cold fluid runner of the first dividing wall type heat exchanger 21 converged with the tube pass output end of the membrane distillation assembly 20 enters the hot seawater storage box. When the seawater in the hot seawater storage box reaches 65° C., it enters the membrane distillation assembly 20 via the second valve b. The membrane material in the membrane distillation assembly is a hydrophobic hollow fiber membrane, and aqueous solutions on two sides of a membrane cannot interpenetrate to the other side but the seawater on one side of the hot fluid is evaporated to become water vapor. Driven by a pressure difference between water vapor on two sides of the membrane, the aqueous solution penetrates and enters the other side of the membrane material and is condensed into liquid fresh water 24 in the condenser 22. The liquid fresh water is discharged via the fourth valve d, and the pressure difference between water vapor of the hydrophobic membrane distillation assembly is maintained.

The membrane type thermoosmosis power generation module is structured such that the medium-low temperature flue gas 16 flowing out from the hot seawater storage box is introduced into the hot box, and the heating coil is arranged in the hot box for absorbing waste heat from the hot box; the membrane contactor 32 is provided with the cold fluid runner and the hot fluid runner, and the semipermeable membrane is arranged between the cold fluid runner and the hot fluid runner of the membrane contactor 32, and the fluids in the cold fluid runner and the hot fluid runner of the membrane contactor 32 are opposite in flow direction (that is, the input end of the cold fluid runner and the output end of the hot fluid runner are located on the same side of the membrane contactor 32, and the output end of the cold fluid runner and the input end of the hot fluid runner are located on the same side of the membrane contactor 32); the third dividing wall type heat exchanger 35 is provided with the cold fluid runner and the hot fluid runner, and the sensible heat exchanger is arranged between the cold fluid runner and the hot fluid runner of the third dividing wall type heat exchanger 35, and the fluids in the cold fluid runner and the hot fluid runner of the third dividing wall type heat exchanger 35 are opposite in flow direction (that is, the input end of the cold fluid runner and the output end of the hot fluid runner are located on the same side of the third dividing wall type heat exchanger 35, and the output end of the cold fluid runner and the input end of the hot fluid runner are located on the same side of the third dividing wall type heat exchanger 35); the second dividing wall type heat exchanger 33 is arranged between the membrane contactor 32 and the third dividing wall type heat exchanger 35, and the second dividing wall type heat exchanger is provided with the cold fluid runner and the hot fluid runner, and the cold fluid flows through the tube pass and the hot fluid flows through the shell pass, and the sensible heat exchanger is arranged between the cold fluid runner and the hot fluid runner of the second dividing wall type heat exchanger, and the fluids in the cold fluid runner and the hot fluid runner thereof are opposite in flow direction (that is, the input end of the cold fluid runner and the output end of the hot fluid runner are located on the same side of the second dividing wall type heat exchanger 33, and the output end of the cold fluid runner and the input end of the hot fluid runner are located on the same side of the second dividing wall type heat exchanger 33).

The output end of the heating coil is connected to the input end of the hot fluid runner in the membrane contactor 32, and the output end of the hot fluid runner in the membrane contactor 32 passes through the cold fluid runner of the third dividing wall type heat exchanger 35 and is communicated to the input end of the heating coil 28; on the one hand, the output end of the cold fluid runner in the membrane contactor 32 is communicated to the input end of the turbine and on the other hand, the output end thereof passes through the hot fluid runner of the third dividing wall type heat exchanger 35 and enters the hot fluid runner of the second dividing wall type heat exchanger 33, and the output end of the hot fluid runner of the second dividing wall type heat exchanger is connected to the input end of the cold fluid runner in the membrane contactor 32; and the output end of the turbine is connected to the input end of the heating coil.

When the membrane type thermoosmosis power generation module works, the medium-high temperature flue gas 6 passes through the hot seawater storage box and is then introduced into the hot box, and the hot water 15 generated by the lithium bromide absorption type cold hot water unit is introduced into the hot box to release heat, and finally, the domestic hot water 27 is discharged via the eighth valve h. The hot fluid which absorbed heat in the heating coil and the cold fluid flowing out from the output end of the hot fluid runner of the third dividing wall type heat exchanger 35 flow in a countercurrent manner in the membrane contactor 32; the semipermeable membrane in the membrane contactor 32 has high hydrophobicity and high moisture-penetrability. As the pressure of the hot fluid runner in the membrane contactor 32 is larger than that of the cold fluid runner, a pressure difference is generated between the cold fluid runner and the hot fluid runner. Hot steam in the hot fluid runner penetrates through the semipermeable membrane and enters the cold fluid runner due to the pressure difference to achieve a heat mass exchange purpose, thereby, heat and mass of the fluid in the cold fluid runner are increased. Increased mass in the cold fluid runner of the membrane contactor 32 causes that the fluid flowing out from the cold fluid runner output end is increased and that a pressure thereof is increased, and the increased fluid and pressure can be used for pushing the power generation mechanism to generate electricity and output an second electric load 31. Water after power generation flows back to the heating coil to absorb heat continuously so as to provide continuous heat energy cyclically.

The fluid output from the output end of the cold fluid runner in the membrane contactor 32 is used for driving the turbine to generate electricity on the one hand, and the fluid needs to flow back to the input end of the cold fluid runner in the membrane contactor 32 to form a water supply circulation on the other hand. The fluid flowing out from the output end of the hot fluid runner in the membrane contactor 32 needs to flow back to the input end of the heating coil to absorb waste heat in the hot box 29 cyclically. The third dividing wall type heat exchanger 35 plays a role of exchanging heat of the fluids flowing out from the output end of the cold fluid runner and the output end of the hot fluid runner in the membrane contactor 32. Specifically, the fluid flowing out from the output end of the hot fluid runner in the membrane contactor 32 passes through the third dividing wall type heat exchanger 35, absorbs heat and then flows back to the heating coil; and the fluid flowing out from the output end of the cold fluid runner in the membrane contactor 32 passes through the third dividing wall type heat exchanger 35, releases heat, and then enters the second dividing wall type heat exchanger to exchange heat with the cold water 14 from the lithium bromide absorption type cold hot water unit, releases heat continuously, and then flows back to the cold fluid runner of the membrane contactor 32. The water 34 which absorbed heat is drained via the cold fluid output end of the second dividing wall type heat exchanger 33. It is to be noted that the third dividing wall type heat exchanger 35 uses the sensible heat exchanger and like the second dividing wall type heat exchanger 33, the third dividing wall type heat exchanger does not have a mass transfer characteristic but only can be used for exchanging sensible heat, so that it can be ensured that the fluids flowing out from the output end of the cold fluid runner and the output end of the hot fluid runner in the membrane contactor 32 merely exchange heat rather than generating mass transfer.

The distributed energy source system utilizing waste heat deeply has the functions of producing cold and hot loads, producing steam, drying air and desalinating seawater and generating electricity at low temperature. The system is high in energy utilization rate and improves the waste heat utilization efficiency.

The embodiments are preferred modes of execution of the present invention. The modes of execution of the present invention are not limited by the embodiments. Any other changes, modifications, substitutions, combinations and simplifications made without departing from the spirit and principle of the present invention shall be equivalent substitute modes and shall come within the protection scope of the present invention.

What is claimed is:

1. A distributed energy source system for improving waste heat utilization efficiency, comprising:
   a primary waste heat recycling module, comprising an absorption type cold/hot water unit, wherein the absorption type cold/hot water unit absorbs heat in a medium-high temperature flue gas and generates both a heated water and a cooled water, wherein the medium-high temperature flue gas has a temperature higher than 120° C.;
   a membrane distillation type seawater desalination module, comprising:
   a hot seawater storage mechanism for introducing the medium-high temperature flue gas, wherein the hot seawater storage mechanism is internally provided with a liquid pump, and the hot seawater storage mechanism stores a hot seawater having a temperature of 65° C.;
   a hydrophobic membrane distillation assembly, wherein the hydrophobic membrane distillation assembly is communicated with the liquid pump;
   a condensation mechanism for introducing seawater as condensate water; and
   a first dividing wall type heat exchanger, wherein the hydrophobic membrane distillation assembly, the condensation mechanism, the first dividing wall type heat exchanger and the hot seawater storage mechanism are communicated in sequence; and
   a membrane type thermoosmosis power generation module, comprising:
   a heat storage mechanism connected with both a heated water output end of the absorption type cold/hot water unit and a flue gas output end of the hot seawater storage mechanism; and
   a heating mechanism arranged in the heat storage mechanism for heating, wherein a first end of the heating mechanism, a membrane contactor, a third dividing wall type heat exchanger and a second end of the heating mechanism are communicated in sequence to realize circulation of a heated fluid, wherein a first end of the membrane contactor, the third dividing wall type heat exchanger, a second dividing wall type heat exchanger and the membrane contactor are communicated in sequence to realize circulation of a cooled fluid;
   wherein a cooled water output end of the absorption type cold/hot water unit is communicated with the second dividing wall type heat exchanger, and a cooled water runner output end of the membrane contactor is communicated with a power generation mechanism and the heating mechanism in sequence to push the power generation mechanism to generate electricity.

2. The distributed energy source system for improving waste heat utilization efficiency according to claim 1, wherein the primary waste heat recycling module further comprises a waste heat steam boiler for introducing the medium-high temperature flue gas, and the waste heat steam boiler is communicated with a rotary dehumidifying device.

3. The distributed energy source system for improving waste heat utilization efficiency according to claim 1, wherein the absorption type cold/hot water unit is a lithium bromide cold/hot water unit, the hot seawater storage mechanism is a hot seawater storage box, and the condensation mechanism is a condenser.

4. The distributed energy source system for improving waste heat utilization efficiency according to claim 1, wherein a seawater runner in a shell pass of the condensation mechanism and a water vapor runner in a tube pass of the condensation mechanism are same in flow direction.

5. The distributed energy source system for improving waste heat utilization efficiency according to claim 1, wherein a cooled fluid runner and a heated fluid runner of the first dividing wall type heat exchanger are opposite in flow direction.

6. The distributed energy source system for improving waste heat utilization efficiency according to claim 1, wherein a tube pass output end of the hydrophobic membrane distillation assembly is communicated with the hot seawater storage mechanism, a steam output end of the hydrophobic membrane distillation assembly is communicated with the condensation mechanism, a shell pass output end of the condensation mechanism is communicated with the first dividing wall type heat exchanger, and a cooled fluid output end of the first dividing wall type heat exchanger is communicated with the hot seawater storage mechanism.

7. The distributed energy source system for improving waste heat utilization efficiency according to claim 1, wherein the liquid pump is communicated with the hydrophobic membrane distillation assembly via a pipeline, and the pipeline is provided with a temperature detection mechanism for detecting a temperature of a liquid in the pipeline.

8. The distributed energy source system for improving waste heat utilization efficiency according to claim 1, wherein the heat storage mechanism is a water tank, the heating mechanism is a heating coil, and the power generation mechanism is a turbine.

9. The distributed energy source system for improving waste heat utilization efficiency according to claim 1, wherein a flue gas output end of the heat storage mechanism is communicated with the first dividing wall type heat exchanger and an atmosphere in sequence for discharging a flue gas.

10. The distributed energy source system for improving waste heat utilization efficiency according to claim 1, further comprising a gas turbine power generator set, a flue gas generated by the gas turbine power generator set serving as the medium-high temperature flue gas.

* * * * *